United States Patent
Trotta

[15] 3,656,839
[45] Apr. 18, 1972

[54] PROJECTION LENS OF HIGH NUMERICAL APERTURE

[72] Inventor: Patrick A. Trotta, Penfield, N.Y.
[73] Assignee: Bausch & Lomb Incorporated, Rochester, N.Y.
[22] Filed: Oct. 1, 1970
[21] Appl. No.: 77,271

[52] U.S. Cl. .......................................... 350/214, 350/204
[51] Int. Cl. ............................... G02b 9/64, G02b 13/04
[58] Field of Search .................................................. 350/214

[56] References Cited
UNITED STATES PATENTS 3,551,031   12/1970   Grey ..................................... 350/214

*Primary Examiner*—John K. Corbin
*Attorney*—Frank C. Parker

[57] ABSTRACT

A reversed telephoto projection lens of 200x magnification having a numerical aperture of 0.45 and long back focus comprises two groups, a three-element negative group spaced from a seven-element positive group by a factor of substantially 6.5x the focal length of the lens, being intended for use in a system with a plano-parallel cover glass.

4 Claims, 1 Drawing Figure

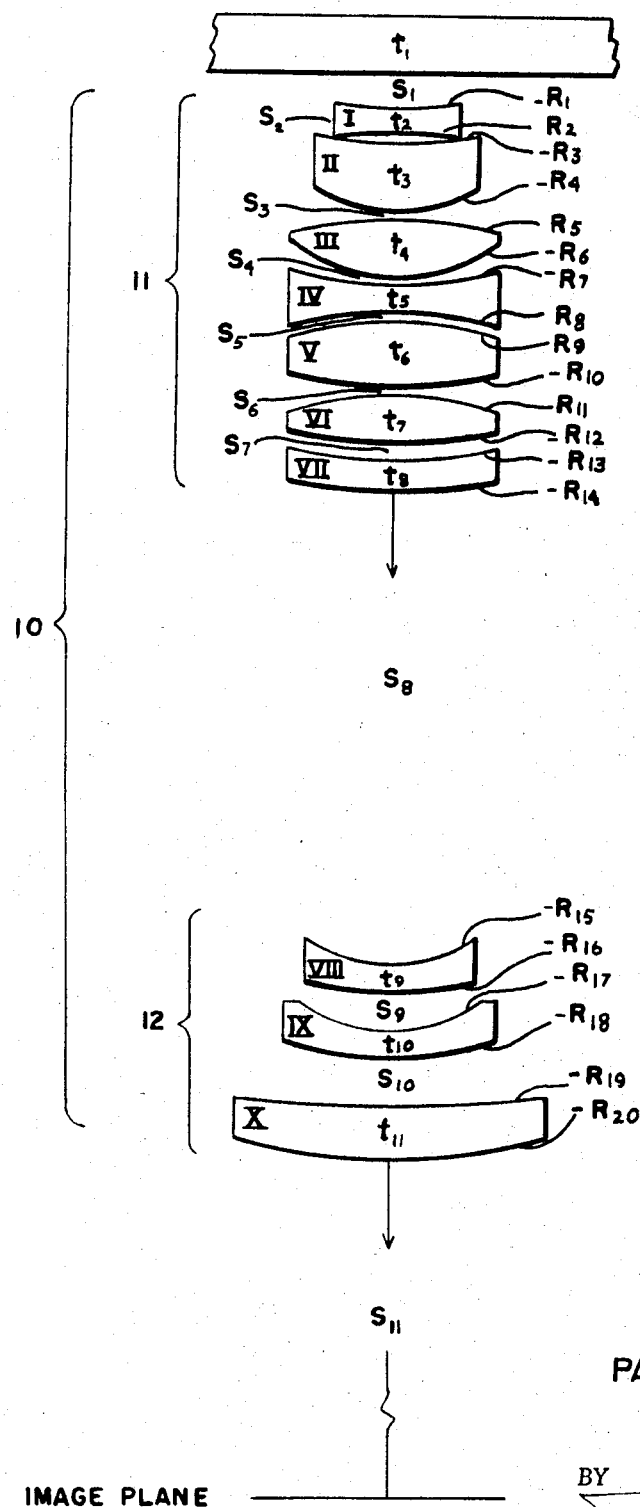

PROJECTION LENS OF HIGH NUMERICAL APERTURE

BACKGROUND OF THE INVENTION

1. Field of the Invention

My invention lies in the field of optical lenses, and more particularly, in the field of multiple component optical lenses.

2. Description of the Prior Art

U.S. Pat. Nos. 3,432,226 and 3,437,403 to Thomas S. Bird, and application Ser. No. 838,596, of David S. Grey, now U.S. Pat. No. 3,551,031, disclosed earlier inverse telephoto designs of the same general kind as the present lens, all of the foregoing being assigned to the same assignee as the present invention.

It may be noted that the present lens departs from these lenses in increased nominal magnification and numerical aperture. The negative group is more widely separated from the positive group and the sensitivity of the present lens to manufacturing tolerances is minimized. Table I, below, sets forth these comparisons.

TABLE I

| | Ser. No. 3,432,226 | Ser. No. 3,437,403 | Ser. No. 838,596 | present lens |
|---|---|---|---|---|
| Nominal magnification | 115× | 150× | 150× | 200× |
| Numerical aperture | 0.33 | 0.42 | 0.42 | 0.45 |
| Separation of lens | 3.06F | 4.07F | 4.97F | 6.55F |

SUMMARY OF THE INVENTION

The lens of my invention is intended to be used at fixed conjugates with a relatively thick plano-parallel cover glass which supports material, as for instance a microfiche card, to be projected by the lens. The lens is intended to work with the cover glass in the rear conjugate, however, the cover glass is not specified as to thickness or refractive index, since many standard cover glasses are compatible with the lens, as is more fully discussed below.

The lens has a long back focus, relatively speaking. In addition, it provides a 20° half-angle field of coverage, good flatness of field and good image resolution. The lens has an extremely high numerical aperture of 0.45, which is unusual in a lens having so wide an angle of coverage and being so well corrected. The nominal magnification is 200×, however, small variations in the rear conjugates may reduce or increase the magnification by as much as 50×, corresponding adjustment of the image screen position being assumed.

The lens comprises two groups of component lenses, with a negative group comprising three elements toward the front, or projection side, and a positive group comprising seven elements toward the rear, or object side, the object here referring to the film gate. The positive group is made up of three subgroups.

The first subgroup consists of a negative lens which is double concave, and which is air-separated from a thick positive meniscus lens concave to the rear. The second subgroup begins with a third lens which is a relatively thick double convex lens. It is narrowly air-spaced from the fourth lens which is a negative, double concave lens whose radii are not radically different from its neighboring radii in the third and fifth elements, leading to speculation that a variant of the present lens, suitably designed, could employ in place of the second subgroup a cemented triplet, or possibly even a doublet. The fifth element is air-spaced from the fourth and is a relatively thick double convex lens. The third and last subgroup of the positive lens group begins with a relatively thick sixth element, a double convex lens, air-spaced from the fifth element, and ends with a seventh element, a negative meniscus lens concave to the rear, and air-spaced from the sixth. As with the second subgroup, a doublet could replace the third subgroup, assuming suitable redesign.

A long space, on the order of 6.5 times the focal length of the entire lens, intervenes between the seventh element of the positive group and the first element of the negative group, being the eighth element overall. The eighth and ninth elements are both relatively strong negative meniscus lenses, concave to the rear and being separated by a short airspace, the ninth element being of larger diameter than the eighth. The 10th element, the last of both the negative group and of the overall lens, is the largest diameter single element in the lens. It is spaced relatively widely from the ninth element, and it comprises a positive meniscus lens, which is, like all the other meniscus lenses, concave to the rear.

It is an important feature of the lens that it is highly corrected to produce an image of excellent quality at 200× magnification, the corrections for spherical aberration and coma being introduced primarily in the positive group while the corrections for distortion and astigmatism are accomplished primarily in the negative group.

BRIEF DESCRIPTION OF THE DRAWING

The drawing depicts a schematic diagram of the lens of my invention.

DESCRIPTION OF THE PREFERRED EMBODIMENT

In the drawing my lens appears generally under the bracket 10, and it may be seen to include both the positive group 11 and the negative group 12.

The overall lens is intended to be used with a plano parallel cover glass in the rear conjugate, which is not assigned a Roman Numeral designation and is not regarded as one of the lens elements.

The cover glass to be used with my lens may be any of several possible ones. Suppose $t_o$ is the thickness of the cover glass for which my lens was specifically designed, being 0.704F, where F is the Focal length of the lens. Then if $t_n$ is the thickness of a substituted cover glass, $N_o$ is the refractive index of the present cover glass (actually 1.523), and $N_n$ is the refractive index of the substituted cover glass, then the substituted cover glass must obey the law that $$t_n = \frac{(N_o^2 - 1) N_n^3}{(N_n^2 - 1) N_o^3} t_o$$

to the Third order approximation, the tolerance on this expression being such that $$\frac{N^2 - 1}{N^3} t$$

should vary less than ±0.1.

In addition, as respects the Abbe number of the substituted cover glass, $\nu_n$, and the original, $\nu_o$ (actually 58.6), the condition is that $$t_n = \frac{(N_o - 1)\nu_n N_n^2}{\nu_o N_o^2 (N_n - 1)} t_o$$

and the tolerance is that $$\frac{N - 1}{\nu N^2} (0.2025) t$$

should not vary more than ±0.001.

In order to control both simultaneously the above formulae may be combined so that $$\frac{\nu_n}{\nu_o} = \frac{(N_o^2 - 1)(N_n - 1) N_n}{(N_n^2 - 1)(N_o - 1) N_o}$$

The sequence of lens elements proceeds from back to front as described above in the summary. The designations there employed, i.e., "first element," "second element," etc., are carried through by labeling the first element, lens Roman Numeral I, and the second, lens Roman Numeral II, etc.

As respects the particular lens elements I to X their equivalent focal lengths, respectively, are designated $F_I$, $F_{II}$, etc., referring to the ratio they bear to the overall lens system focal length, and are given in Table II herebelow. It may be noted that a minus sign (−) is employed therein to designate negative focal lengths.

TABLE II

| | |
|---|---|
| $-F_I$ | = 4.354 F |
| $F_{II}$ | = 3.865 F |
| $F_{III}$ | = 3.478 F |
| $-F_{IV}$ | = 3.191 F |
| $F_V$ | = 2.998 F |
| $F_{VI}$ | = 6.394 F |
| $-F_{VII}$ | = 7.663 F |
| $-F_{VIII}$ | = 5.271 F |
| $-F_{IX}$ | = 6.227 F |
| $F_X$ | = 11.806 F |

Due to the method of manufacture and assembly used for the lens 10, all of the above nominal values may in practice be varied by a small amount from the nominal or ideal values as given in the foregoing or succeeding tables. In the aforesaid method, comparatively large numbers of each lens element in the lens are produced according to good manufacturing standards having practical limits suitable for large scale production. The resultant non-ideal lens parts depart slightly from the true nominal values as given in the specification and are evaluated as indicated in certain of the tables appearing hereinafter. Particularly the airspaces and lens thicknesses may be adjusted slightly by a skilled optician in such a way as to restore good optical performance. With a multiplicity of lens parts having varying lens parameters available to skilled operators, it is therefore possible to successfully assemble a large proportion of non-ideal lenses which perform well optically and are commercially acceptable.

The nominal values for the successive lens radii are given in Table III below in terms of the numerical ratios of their absolute values, the minus signs (−) used with various radii signifying those lens surfaces which are concave toward the object.

TABLE III

| | |
|---|---|
| (Lens I): | $-R_1/R_2 = 1.219$ (Absolute Value) |
| (Lens II): | $-R_3/-R_4 = 5.719$ (Absolute Value) |
| (Lens III): | $R_5/-R_6 = 7.334$ (Absolute Value) |
| (Lens IV): | $-R_7/R_8 = 0.917$ (Absolute Value) |
| (Lens V): | $R_9/-R_{10} = 1.753$ (Absolute Value) |
| (Lens VI): | $R_{11}/-R_{12} = 0.393$ (Absolute Value) |
| (Lens VII): | $-R_{13}/-R_{14} = 0.154$ (Absolute Value) |
| (Lens VIII): | $R_{15}/-R_{16} = 0.312$ (Absolute Value) |
| (Lens IX): | $-R_{17}/-R_{18} = 0.457$ (Absolute Value) |
| (Lens X): | $-R_{19}/-R_{20} = 7.776$ (Absolute Value) |

The said radii are further given in Tables IV and V, below, in terms of their relation to the overall focal length F of the lens, the minus sign (−) again referring to those lens surfaces which are concave to the object side. Table IV provides the nominal relations of each radius, while Table V gives the ranges of the permissible manufacturing variations above referred to.

TABLE IV

| | |
|---|---|
| $-R_1$ | = 7.022 F |
| $R_2$ | = 5.760 F |
| $-R_3$ | = 13.055 F |
| $-R_4$ | = 2.283 F |
| $R_5$ | = 19.763 F |
| $-R_6$ | = 2.695 F |
| $-R_7$ | = 4.474 F |
| $R_8$ | = 4.878 F |
| $R_9$ | = 5.456 F |
| $-R_{10}$ | = 3.112 F |
| $R_{11}$ | = 6.085 F |
| $R_{12}$ | = 15.493 F |
| $-R_{13}$ | = 4.641 F |
| $-R_{14}$ | = 30.089 F |
| $-R_{15}$ | = 1.828 F |
| $-R_{16}$ | = 5.869 F |
| $-R_{17}$ | = 1.658 F |
| $-R_{18}$ | = 3.625 F |
| $-R_{19}$ | = 57.982 F |
| $-R_{20}$ | = 7.456 F |

TABLE V

| Radius Ranges |
|---|
| $6.889\ F < -R_1 < 7.155\ F$ |
| $5.685\ F < R_2 < 5.835\ F$ |
| $12.735\ F < -R_3 < 13.375\ F$ |
| $2.278\ F < -R_4 < 2.288\ F$ |
| $19.396\ F < R_5 < 20.130\ F$ |
| $2.690\ F < -R_6 < 2.700\ F$ |
| $4.457\ F < -R_7 < 4.491\ F$ |
| $4.859\ F < R_8 < 4.897\ F$ |
| $5.433\ F < R_9 < 5.479\ F$ |
| $3.106\ F < -R_{10} < 3.118\ F$ |
| $6.052\ F < R_{11} < 6.118\ F$ |
| $15.242\ F < -R_{12} < 15.744\ F$ |
| $4.619\ F < -R_{13} < 4.663\ F$ |
| $29.073\ F < -R_{14} < 31.105\ F$ |
| $1.825\ F < -R_{15} < 1.831\ F$ |
| $5.835\ F < -R_{16} < 5.903\ F$ |
| $1.656\ F < -R_{17} < 1.660\ F$ |
| $3.617\ F < -R_{18} < 3.633\ F$ |
| $56.833\ F < -R_{19} < 59.131\ F$ |
| $7.440\ F < -R_{20} < 7.472\ F$ |

The nominal values and their ranges, respectively, in terms of the focal length F of the overall lens, are given in Tables VI and VII, below, for the spaces $S_1$ to $S_{11}$ between the elements and their thicknesses $t_1$ through $t_{11}$. It will be appreciated that the values appearing for $S_1$ and $t_1$, relating to the cover glass and its separation from the lens proper are only nominal and that certain variations may be allowed in them. Accordingly, ranges are not given for $S_1$ and $t_1$ since these may be determined by routine trial and error during the mounting of my lens in a suitable instrument.

TABLE VI

| | |
|---|---|
| $S_1 = F$ nominal | $t_1 = 0.740\ F$ nominal |
| $S_2 = 0.118\ F$ | $t_2 = 0.284\ F$ |
| $S_3 = 0.011\ F$ | $t_3 = 0.947\ F$ |
| $S_4 = 0.047\ F$ | $t_4 = 0.734\ F$ |
| $S_5 = 0.110\ F$ | $t_5 = 0.355\ F$ |
| $S_6 = 0.015\ F$ | $t_6 = 0.900\ F$ |
| $S_7 = 0.178\ F$ | $t_7 = 0.592\ F$ |
| $S_8 = 6.555\ F$ | $t_8 = 0.332\ F$ |
| $S_9 = 0.414\ F$ | $t_9 = 0.284\ F$ |
| $S_{10} = 0.683\ F$ | $t_{10} = 0.284\ F$ |
| $S_{11} = 190.763\ F$ nominal | $t_{11} = 0.676\ F$ |

TABLE VII

| | |
|---|---|
| $0.095\ F < S_2 < 0.142\ F$ | $0.279\ F < t_2 < 0.289\ F$ |
| $0.009\ F < S_3 < 0.013\ F$ | $0.943\ F < t_3 < 0.952\ F$ |
| $0.043\ F < S_4 < 0.052\ F$ | $0.727\ F < t_4 < 0.741\ F$ |
| $0.107\ F < S_5 < 0.112\ F$ | $0.348\ F < t_5 < 0.362\ F$ |
| $0.013\ F < S_6 < 0.017\ F$ | $0.895\ F < t_6 < 0.905\ F$ |
| $0.175\ F < S_7 < 0.180\ F$ | $0.585\ F < t_7 < 0.599\ F$ |
| $6.531\ F < S_8 < 6.578\ F$ | $0.320\ F < t_8 < 0.343\ F$ |
| $0.403\ F < S_9 < 0.426\ F$ | $0.272\ F < t_9 < 0.296\ F$ |
| $0.671\ F < S_{10} < 0.695\ F$ | $0.272\ F < t_{10} < 0.296\ F$ |
| $171.00\ F < S_{11} < 210\ F$ | $0.674\ F < t_{11} < 0.679\ F$ |

The nominal values and permissible ranges, respectively of the refractive indices, $n_D$, and of the Abbe numbers $\nu$ are given in Tables VIII and IX, below. It may be observed that only three optical glasses, having high, moderate and low refractive indices were employed in designing my lens.

| Element | F/F₀ | Radii ratio | Thickness | Intervening space | Refractive index | Abbe Number |
|---|---|---|---|---|---|---|
| I | −4.4F | −R₁/R₂=1.22 | .28F | | 1.720 | 29.3 |
| II | 3.9F | −R₃/−R₄=5.72 | .95F | .12F | 1.691 | 54.8 |
| III | 3.5F | R₅/−R₆=7.33 | .73F | .01F | 1.691 | 54.8 |
| IV | −3.2F | −R₇/R₈=0.92 | .36F | .05F | 1.720 | 29.3 |
| V | 3.0F | R₉/−R₁₀=1.75 | .90F | .11F | 1.691 | 54.8 |
| VI | 6.4F | R₁₁/−R₁₂=0.39 | .59F | .02F | 1.691 | 54.8 |
| VII | −7.7F | −R₁₃/−R₁₄=0.15 | .33F | .18F | 1.720 | 29.3 |
| VIII | −5.3F | −R₁₅/−R₁₆=0.31 | .28F | 6.5F | 1.516 | 64.0 |
| IX | −6.2F | −R₁₇/−R₁₈=0.46 | .28F | .41F | 1.516 | 64.0 |
| X | 11.8F | −R₁₉/−R₂₀=7.78 | .68F | .68F | 1.720 | 29.3 |

TABLE VIII

| | | | |
|---|---|---|---|
| $n_D(I)$ | = 1.720 | $\nu(I)$ | = 29.3 |
| $n_D(II)$ | = 1.691 | $\nu(II)$ | = 54.8 |
| $n_D(III)$ | = 1.691 | $\nu(III)$ | = 54.8 |
| $n_D(IV)$ | = 1.720 | $\nu(IV)$ | = 29.3 |
| $n_D(V)$ | = 1.691 | $\nu(V)$ | = 54.8 |
| $n_D(VI)$ | = 1.691 | $\nu(VI)$ | = 54.8 |
| $n_D(VII)$ | = 1.720 | $\nu(VII)$ | = 29.3 |
| $n_D(VIII)$ | = 1.516 | $\nu(VIII)$ | = 64.0 |
| $n_D(IX)$ | = 1.516 | $\nu(IX)$ | = 64.0 |
| $n_D(X)$ | = 1.720 | $\nu(X)$ | = 29.3 |

TABLE IX

| | |
|---|---|
| $1.717 < n_D(I) < 1.723$ | $26.0 < \nu(I) < 32.0$ |
| $1.688 < n_D(II) < 1.694$ | $50.2 < \nu(II) < 59.2$ |
| $1.688 < n_D(III) < 1.694$ | $50.2 < \nu(III) < 59.2$ |
| $1.717 < n_D(IV) < 1.723$ | $26.0 < \nu(IV) < 32.0$ |
| $16.88 < n_D(V) < 1.694$ | $50.2 < \nu(V) < 59.2$ |
| $1.688 < n_D(VI) < 1.694$ | $50.2 < \nu(VI) < 59.2$ |
| $1.717 < n_D(VII) < 1.723$ | $26.0 < \nu(VII) < 32.0$ |
| $1.513 < n_D(VIII) < 1.519$ | $59.5 < \nu(VIII) < 68.5$ |
| $1.513 < n_D(IX) < 1.519$ | $59.5 < \nu(IX) < 68.5$ |
| $1.717 < n_D(X) < 1.723$ | $26.0 < \nu(X) < 32.0$ |

I claim:

1. In an inverse telephoto lens, for use with a cover glass in the rear conjugate, comprising a rear positive group consisting of three subgroups of elements wherein:
   1. the first subgroup consists of a double concave negative singlet of high refractive index and a relatively thick positive meniscus singlet of moderate refractive index;
   2. the second subgroup consists of a positive compound member composed of high and moderate refractive index elements; and
   3. the third subgroup consists of a positive compound member composed of high and moderate refractive index elements, an improved front negative group consisting of three mutually air-spaced elements wherein:
      1. the first is a negative meniscus singlet, concave to the rear;
      2. the second is a negative meniscus singlet, concave to the rear; and
      3. the third is a positive meniscus singlet concave to the rear, and said front negative group is separated from said rear positive group by a factor of at least 6.5 times the overall focal length F of said lens;
   said front negative group substantially conforming to the following characteristics wherein the specific lenses, radii, thicknesses and spaces correspond to those described in the foregoing drawing and specification:

| Radii | Thicknesses | Spaces | Refractive Indices | Abbe numbers |
|---|---|---|---|---|
| −R₁₅=1.828F | t₉=.284F | | $n_D(VIII)=1.516$ | $\nu(VIII)=64.0$ |
| −R₁₆=5.869F | | S₉=.414F | | |
| −R₁₇=1.658F | t₁₀=.284F | | $n_D(IX)=1.516$ | $\nu(IX)=64.0$ |
| −R₁₈=3.625F | | S₁₀=.683F | | |
| −R₁₉=57.982F | t₁₁=.676F | | $n_D(X)=1.720$ | $\nu(X)=29.3$ |
| −R₂₀=7.456F | | | | |

2. An inverse telephoto lens of 10 airspaced elements, for use with a cover glass in the rear conjugate, having substantially the following characteristics:

wherein F is the overall focal length of the lens, F₀ is the effective focal length of each element of said lens (the minus sign (−) denoting negative focal length) in terms of F, and R is a radius (the minus sign (−) denoting concavity to the rear).

3. A lens of the inverse telephoto type for finite conjugates and having a magnification in excess of 150X, a numerical aperture of substantially .45, a field half-angle of substantially 20° with excellent resolution and a very flat field, said lens comprising in sequence along an optical axis from an object space located on the surface of a cover glass, said cover glass occupying a portion of the rear conjugate of said lens:

a. a negative double concave lens element designated I air-spaced from said cover glass;

b. a positive meniscus lens element designated II, concave toward said object space and air-spaced from said lens I;

c. a double convex lens element designated III and air-spaced from said lens II;

d. a negative double concave lens element designated IV and air-spaced from said lens III;

e. a double convex lens element designated V air-spaced from said lens IV;

f. a double convex lens element designated VI air-spaced from said lens V;

g. a negative meniscus lens element designated VII, concave toward the object space and air-spaced from said lens VI, said lens elements I-VII together comprising a rearward positive lens portion of said inverse telephoto lens;

h. a negative meniscus lens element designated VIII, concave toward the rear and being air-separated from said lens VII by a length greater than 6.5X the the focal length of the overall lens;

i. a negative meniscus lens element designated IX, concave toward the rear, and being air-separated from said lens VIII;

j. a positive meniscus lens element designated X, concave toward the rear and being air-separated from said lens IX, said lenses VIII, IX and X forming a frontward negative lens portion of said inverse telephoto lens, the nominal equivalent focal lengths of said lens elements I-X being given herebelow in terms of F, the minus sign (−) referring to negative focal length:

$F_{II}$ = 3.865 F
$F_{III}$ = 3.478 F
$-F_{IV}$ = 3.191 F
$F_V$ = 2.998 F
$F_{VI}$ = 6.394 F
$-F_{VII}$ = 7.663 F
$-F_{VIII}$ = 5.271 F
$-F_{IX}$ = 6.227 F
$F_X$ = 11.806 F, the lens elements I, IV, VII and X being of glass having substantially refractive index 1.720 and Abbe number 29.3, the lens elements II, III, V and VI being of glass having substantially refractive index 1.691 and Abbe number 54.8, the lens elements VIII and IX being of glass having substantially refractive index 1.516 and Abbe number 64.0, the lens elements having consecutive spaces $S_2$ to $S_{10}$ beginning, respectively, with space $S_2$ between said lens elements I and II, and said lens elements having consecutive thicknesses $t_2$ to $t_{11}$, said thickness $t_2$ referring to said lens element I, said spaces and thicknesses being set forth in permissible ranges herebelow:

$0.095\ F < S_2 < 0.142\ F$
$0.009\ F < S_3 < 0.013\ F$
$0.043\ F < S_4 < 0.052\ F$
$0.107\ F < S_5 < 0.112\ F$
$0.013\ F < S_6 < 0.017\ F$
$0.175\ F < S_7 < 0.180\ F$
$6.531\ F < S_8 < 6.578\ F$
$0.403\ F < S_9 < 0.426\ F$
$0.671\ F < S_{10} < 0.695\ F$
$171.00\ F < S_{11} < 210\ F$ $0.279\ F < t_2 < 0.289\ F$
$0.943\ F < t_3 < 0.952\ F$
$0.727\ F < t_4 < 0.741\ F$
$0.348\ F < t_5 < 0.362\ F$
$0.895\ F < t_6 < 0.905\ F$
$0.585\ F < t_7 < 0.599\ F$
$0.320\ F < t_8 < 0.343\ F$
$0.272\ F < t_9 < 0.296\ F$
$0.272\ F < t_{10} < 0.296\ F$
$0.674\ F < t_{11} < 0.679\ F.$

4. The lens of claim 3 having successive radii, beginning with said element I, within the ranges listed herebelow:

$6.889\ F < -R_1 < 7.155\ F$
$5.685\ F < R_2 < 5.835\ F$
$12.735\ F < -R_3 < 13.375\ F$
$2.278\ F < -R_4 < 2.288\ F$
$19.396\ F < R_5 < 20.130\ F$
$2.690\ F < -R_6 < 2.700\ F$
$4.457\ F < -R_7 < 4.491\ F$
$4.859\ F < R_8 < 4.897\ F$
$5.433\ F < R_9 < 5.479\ F$
$3.106\ F < -R_{10} < 3.118\ F$
$6.052\ F < R_{11} < 6.118\ F$
$15.242\ F < -R_{12} < 15.744\ F$
$4.619\ F < -R_{13} < 4.663\ F$
$29.073\ F < -R_{14} < 31.105\ F$
$1.825\ F < -R_{15} < 1.831\ F$
$5.835\ F < -R_{16} < 5.903\ F$
$1.656\ F < -R_{17} < 1.660\ F$
$3.617\ F < -R_{18} < 3.633\ F$
$56.833\ F < -R_{19} < 59.131\ F$
$7.440\ F < -R_{20} < 7.472\ F$

* * * * *